US011006068B1

(12) United States Patent
Kuehnle

(10) Patent No.: US 11,006,068 B1
(45) Date of Patent: May 11, 2021

(54) VIDEO RECORDING BASED ON IMAGE VARIANCE

(71) Applicant: Bendix Commercial Vehicle Systems LLC, Elyria, OH (US)

(72) Inventor: Andreas U Kuehnle, Villa Park, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 16/679,888

(22) Filed: Nov. 11, 2019

(51) Int. Cl.
*H04N 7/18* (2006.01)
*H04N 5/77* (2006.01)
*H04N 5/232* (2006.01)

(52) U.S. Cl.
CPC ......... *H04N 5/772* (2013.01); *H04N 5/23245* (2013.01); *H04N 7/18* (2013.01)

(58) Field of Classification Search
CPC ........... G11B 27/3081; G06K 9/00744; G06K 2209/01
See application file for complete search history.

(56) References Cited

U.S. PATENT DOCUMENTS

| 5,751,245 | A | 5/1998 | Janky et al. |
| 5,825,283 | A | 10/1998 | Camhi |
| 6,512,465 | B2 | 1/2003 | Flick |
| 6,611,755 | B1 | 8/2003 | Coffee |
| 6,647,200 | B1 * | 11/2003 | Tanaka ............. G08B 13/19604 |
| | | | 348/E7.086 |
| 6,982,656 | B1 | 1/2006 | Coppinger et al. |
| 7,092,007 | B2 | 8/2006 | Eguchi et al. |
| 7,755,472 | B2 | 7/2010 | Grossman |
| 8,653,956 | B2 | 2/2014 | Berkobin et al. |
| 8,830,046 | B2 | 9/2014 | Yagi |
| 8,879,050 | B2 | 11/2014 | Ko |
| 8,988,493 | B2 | 3/2015 | Luo et al. |
| 9,298,575 | B2 | 3/2016 | Tamari et al. |
| 9,478,074 | B2 | 10/2016 | Hubbard et al. |
| 9,811,748 | B2 | 11/2017 | Mirza |
| 10,074,069 | B2 | 9/2018 | Skaaksrud |
| 2003/0080878 | A1 | 5/2003 | Kirmuss |
| 2005/0190261 | A1 * | 9/2005 | Hamdan ............. G07C 5/0866 |
| | | | 348/148 |

(Continued)

FOREIGN PATENT DOCUMENTS

EP 3229172 A1 4/2016
WO WO2018014916 A1 1/2018

*Primary Examiner* — Thai Q Tran
*Assistant Examiner* — Jose M Mesa
(74) *Attorney, Agent, or Firm* — Cheryl Greenly; Brian Kondas; Eugene Clair

(57) ABSTRACT

A camera system and method for improving the recording of images includes an image capture device, a memory, and an image processor. The image processor receives a first image from the image capture device and a second image from the image capture device and compares the first image to the second image. The image processer will determine if the second image differs from the first image and record the first and second image in the memory at a first recording mode. The image processor will compare a third image to the second image. If the image processor determine that the second image does not differ from the third image, it records the third image in the memory at a second recording mode.

17 Claims, 6 Drawing Sheets

(56) References Cited

U.S. PATENT DOCUMENTS

| | | | |
|---|---|---|---|
| 2006/0171452 A1* | 8/2006 | Waehner | H04N 21/44029 |
| | | | 375/240.01 |
| 2014/0114565 A1 | 4/2014 | Aziz | |
| 2014/0218529 A1* | 8/2014 | Mahmoud | H04N 5/23245 |
| | | | 348/148 |
| 2015/0048941 A1 | 2/2015 | Wagner et al. | |
| 2017/0313332 A1 | 11/2017 | Paget et al. | |
| 2018/0194344 A1* | 7/2018 | Wang | G05D 1/0257 |
| 2019/0356850 A1 | 11/2019 | Ashrafi | |

\* cited by examiner

VIDEO RECORDING BASED ON IMAGE VARIANCE

BACKGROUND

The embodiments herein relate generally to imaging systems for vehicles. It is common to place cameras on vehicles for purposes of providing one or more images of areas external or internal to the vehicle. These images can be monitored in real time by an operator or a fleet manager or recorded for later viewing. The monitoring feature improves the awareness of the operator relative to conditions near the vehicle to avoid collisions and to assist in maneuvering the vehicle for parking or loading. This feature also provides for securely monitoring the actions of the vehicle operator and events that occur around the vehicle. The recorded images may be used in accident reconstruction, theft reduction or for driver training. Due to the volume of images that may be recorded during both the vehicle's operational and non-operational state, there is a need to prioritize the recording and minimize the recording space required.

SUMMARY

Various embodiments of a camera system for improving the recording of images include an image capture device, a memory, and an image processor. The image processor receives a first image from the image capture device and a second image from the image capture device and compares the first image to the second image. The image processer will determine if the second image differs from the first image and record the first and second image in the memory at a first recording mode. The image processor will then compare a third image to the second image. If the image processor determines that the second image does not differ from the third image, it records the third image in the memory at a second recording mode, which is different than the first recording mode.

In accordance with another aspect, various methods of modifying the recording by a camera system include receiving the first image data, the first image data being related to a first image of a first target area. The method further includes receiving the second image data, the second image data being related to a second image of the first target area, and then determining if an image difference exists between the first image data and the second image data. The method further includes recording the first image data and the second image data at a first recording mode if an image difference exists and recording the second image data at a second recording mode if an image difference does not exist.

In another example, a method for evaluating and recording images in a system having a plurality of cameras includes monitoring a register change of each image from the plurality of cameras, determining that at least one of the plurality of cameras has a register change greater than a nominal value, and recording the images in a first recording scheme from the at least one of the plurality of cameras having the register change.

In another example, a method of reducing video storage space requirements includes determining a frame to frame video image difference exists and changing the recording mode of subsequent frames, wherein the recording modes differ in at least one of the amount of frames record, the quality of the image, and the sampling rate of the video frames.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
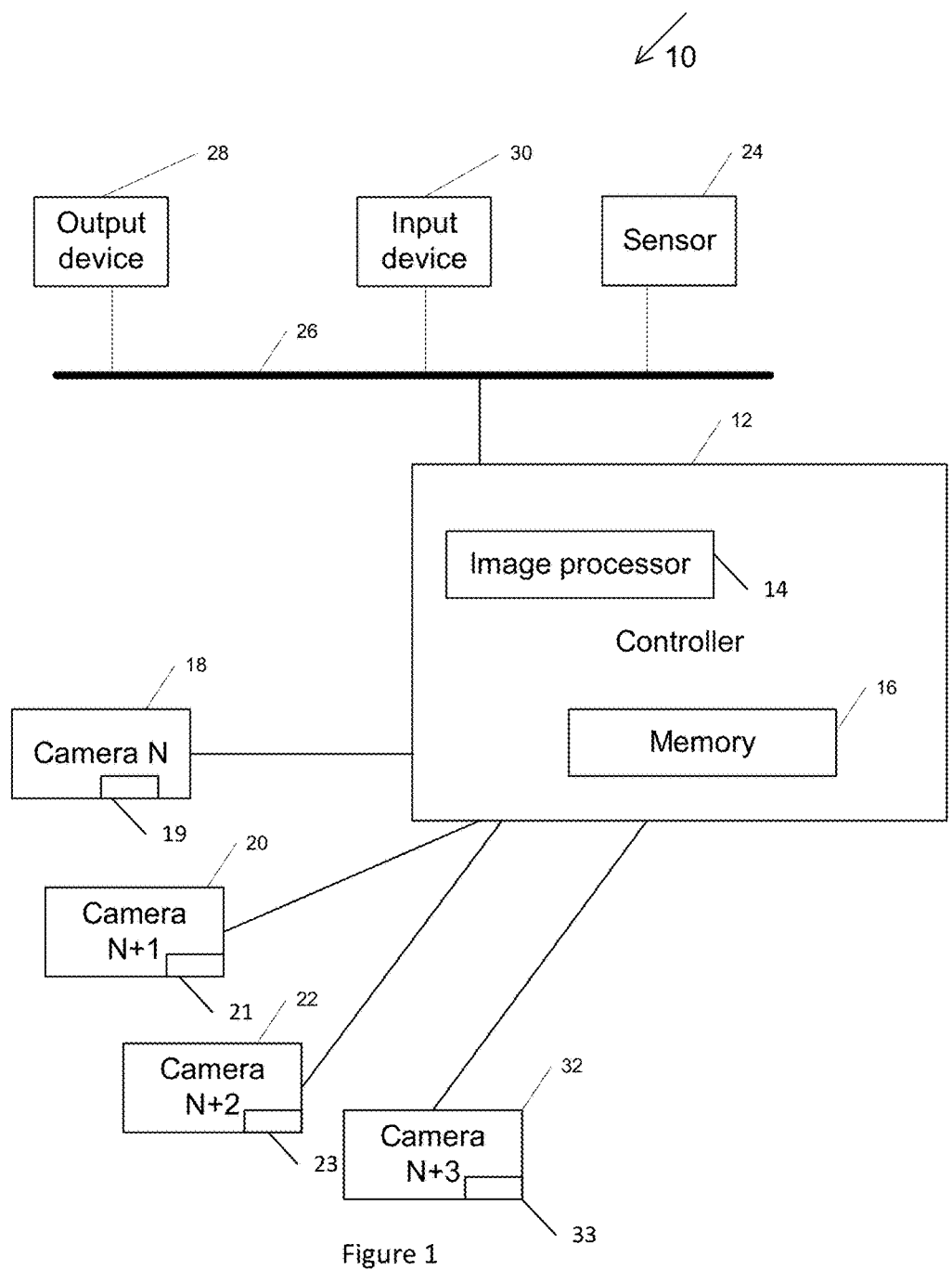
FIG. 1 illustrates a system schematic according to one example of the present invention.

FIG. 1 illustrates an imaging system 10 for a vehicle according to the present invention. System 10 includes at least image one capture device, such as camera 18, which may be a forward facing camera. The system 10 may include additional image capturing devices, such as a rear facing camera 20, a cargo compartment camera 22, and a driver facing camera 32. Cameras 18, 20, 22, 32 are oriented to capture views from different locations for monitoring inside and outside of the vehicle, but may also be used in other vehicle functions, such as lane departure warning or back up alarms.

Each camera 18, 20, 22, 32 communicates with a camera controller 12 directly, as shown in FIG. 1, or may communicate via a vehicle communications bus 26. Alternatively, each camera 18, 20, 22, 32 is integrated with its own camera controller.

Cameras 18, 20, 22, 32 each have their own on-board image register 19, 21, 23, 33. The camera electronics monitor the exposure, gain, white balance and other scene derived quantities and the values of these quantities are stored in the image register. Large changes in image register values typically correspond to changes between the images captured by the camera.

Camera controller 12 includes an image processor 14. The image processor 14 receives the images from cameras 18, 20, 22, 32. The image processor 14 may store the captured images into memory 16. The memory 16 may include volatile memory, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the image processor 14. The memory 16 has a finite space for recording images. It is desired to prioritize which camera images are being recorded while reducing the amount of space required in memory 16 when recording images.

The image processor 14 may also compare initial and subsequent images from each camera 18, 20, 22, 32, respectively, as will be explained.

Sensor 24 communicates with camera controller 12 directly or via the vehicle communications bus 26. Sensor 24 monitors for movement of the vehicle. The sensor 24 may be a wheel speed sensor, engine sensor, transmission sensor, global positioning device or other type of sensor that determines vehicle positioning and whether the vehicle is in motion. Alternatively, the controller 12 may receive information regarding the movement of the vehicle from another controller on the vehicle via the communications bus 26.

Output device 28 communicates with the camera controller 12 directly or over the communications bus 26. Output device 28 indicates the status of the system 10 to a driver of the vehicle. Alternatively, the output device 28 is a transmitter that communicates with a fleet location regarding the status of the controller 12. The output device 28 may also communicate the recorded images from the camera controller 12 to the fleet location.

Input device 30 communicates with the camera controller 12 directly or over the communications bus 26. Input device 30 may be used by the driver to set the controller 12 in a particular mode of operation. Alternatively, the input device 30 receives information from a fleet location regarding in which state of operation the fleet desires the camera controller 12 to operate.

Figure 2:
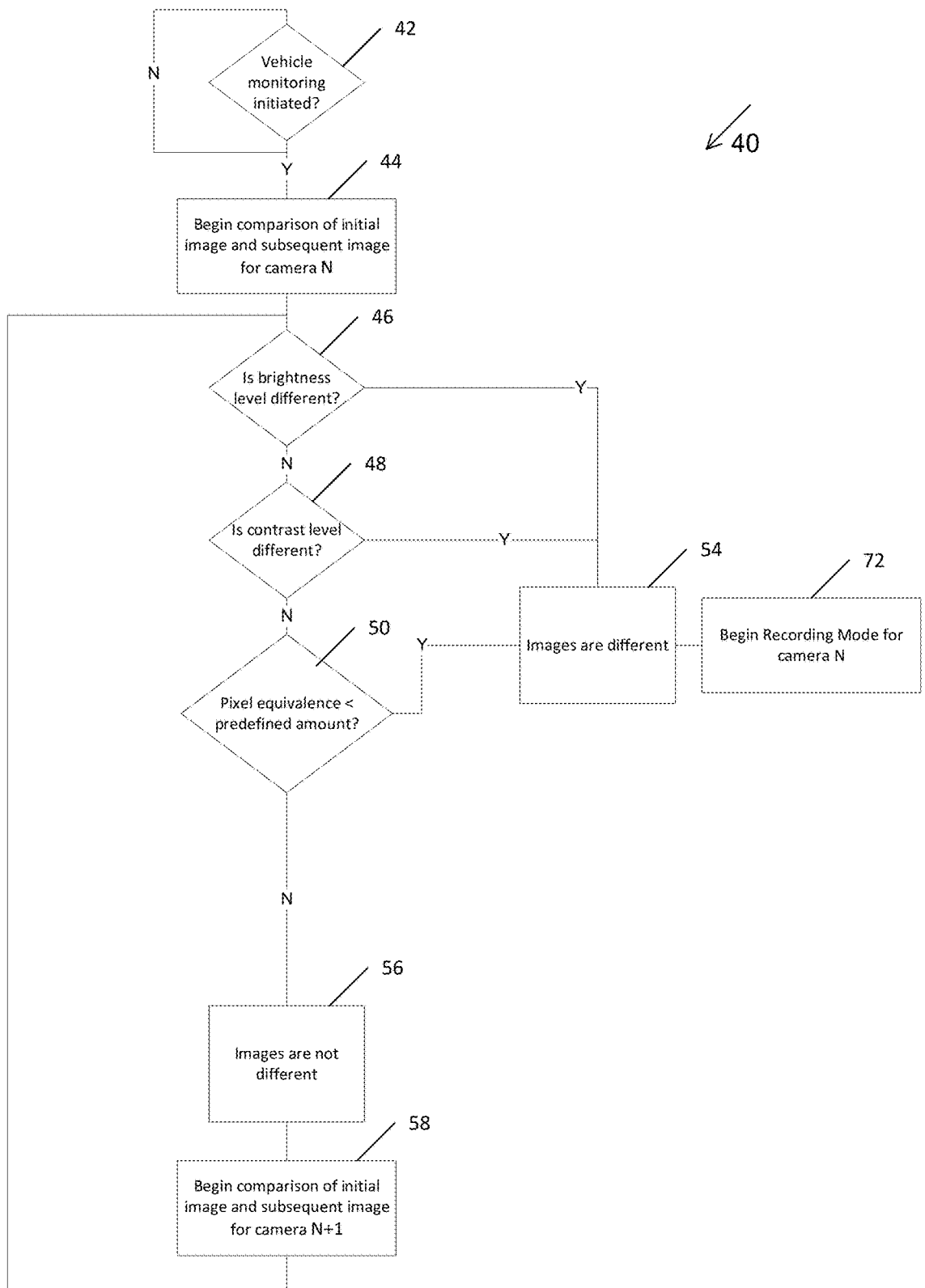
FIG. 2 illustrates a method of determining if images are dissimilar, according to one example of the present invention.

FIG. 2 illustrates a method 40 for determining if images captured by a single camera differ and when to record the images, according to one example described below of the present invention. The amount of image difference required can be established and weighted by the manufacturer of the system or may be programmable by the system owner.

Typical line haul and delivery vehicles have set routes and are monitored while following these routes. In step 42, the controller 12 determines whether to initiate vehicle monitoring. The controller 12 can use information from the sensor 24 or from another controller on the communications bus 26 to learn whether vehicle is in a location that was not part of the vehicle's usual set route and/or the vehicle has been stopped at a location that is along the usual route, but not the defined delivery point. Stops that are not part of the usual route may be of even greater interest, and these deviations may be deemed worthy of monitoring. In an alternate embodiment, initiation of method 40 may be at any time any camera 18, 20, 22, 32 is active. Initiation may be requested by the driver or the fleet location via the input device 30. If no indication is received to initiate the method 40, for example the vehicle is not in an unplanned location, the method 40 remains at step 42 to monitor for a deviation or a separate input request. If the controller 12 determines that the vehicle monitoring should begin, the method 40 continues to step 44.

In step 44, the image processor 14 compares an initial image with a subsequent image captured by camera N, camera 18 in this example. In step 46, the image processor 14 determines if the brightness levels in each image are different.

Average brightness is a calculated parameter for a camera image that requires low computation. For example, a running sum of pixel values may be kept, and their average value calculated when the frame has been fully loaded. In another embodiment, the values of the image register 19 may be compared by looking at the previous image's gain and exposure and comparing it with the current gain and exposure values. These gain and exposure register settings are typically set by an automatic exposure control, and the brightness may be available there also. The automatic exposure control monitors the image pixel content and related statistics. If the register settings differ from image to image, it may indicate that the image pixel content has changed. The brightness mean or median values may be compared to determine if the value has increased or decreased from the first image to the second image. If the brightness levels are different, the image processor 14 determines that the initial image and subsequent images are different and proceeds to step 54.

If the brightness levels are substantially the same, the method 40 continues to step 48. In step 48, the image processor 14 determines if the contrast levels in each image are different. Image contrast requires more computation than image brightness during examination of the image. For instance, a recursive variance calculation may be performed, thereby producing a measure of overall image variability. If the contrast levels have increased or decreased, the image processor 14 determines that the initial image and subsequent images are different and proceeds to step 54.

If the contrast levels are substantially the same, the method 40 continues to step 50. In step 50, the image processor 14 determines if the pixels in the initial image and the subsequent image are equivalent by less than a predetermined amount. Equivalence may be taken as the current and previous pixels at the same or adjacent locations which do not differ by more than a certain amount, e.g. five levels of gray. The percentage of all pixels in the image that are equivalent by this measure is determined. In one example, the predetermined amount is 90%. If the pixels are less than or equal to 90% the same, the image processor 14 determines that the initial image and subsequent images are different and proceeds to step 54. Pixel equivalence is the most computationally intensive measure, as differences between individual pixels are calculated, thresholded, and counted. From step 54, a record mode for camera N will begin in step 72. This information is used in method 70. The type of record mode will be described further herein.

If the pixels are equivalent, such as greater than 90% the same, the method 40 continues to step 56. In step 56, the image processor 14 determines that the initial image and the subsequent image are not different for camera N. In step 58, the comparison of the initial image and subsequent image for camera N+1, or camera 20 in this example, will begin. The comparison continues to follow the steps of method 40 by returning to step 46.

In another embodiment, any one of steps 46, 48, 50 or combination of steps thereof may be considered in the determination of whether the images are different. The step ordering as in method 40 of brightness first, then contrast, and finally pixel difference, is desirable, as the computational effort varies from low to high. That is, it is desired to detect, with as little computation as possible, whether imagery is changing, where changing is indicative of new content, and whether a different recording mode is indicated. By examining the images in the least to most computationally demanding order, and thereby possibly avoiding unnecessary effort, computation effort is reduced.

Therefore, a camera system for recording an image comprises an image capture device, a memory, and an image processor. The image processor receives a first image from the image capture device and a second image from the image capture device, compares the first image to the second image and determines that the second image differs from the first image. The camera system then records the first and second image in the memory at a first recording mode. The camera system compares a third image to the second image, determines that the second image did not change from the third image, and then records the third image in the memory at a second recording mode.

Figure 3:
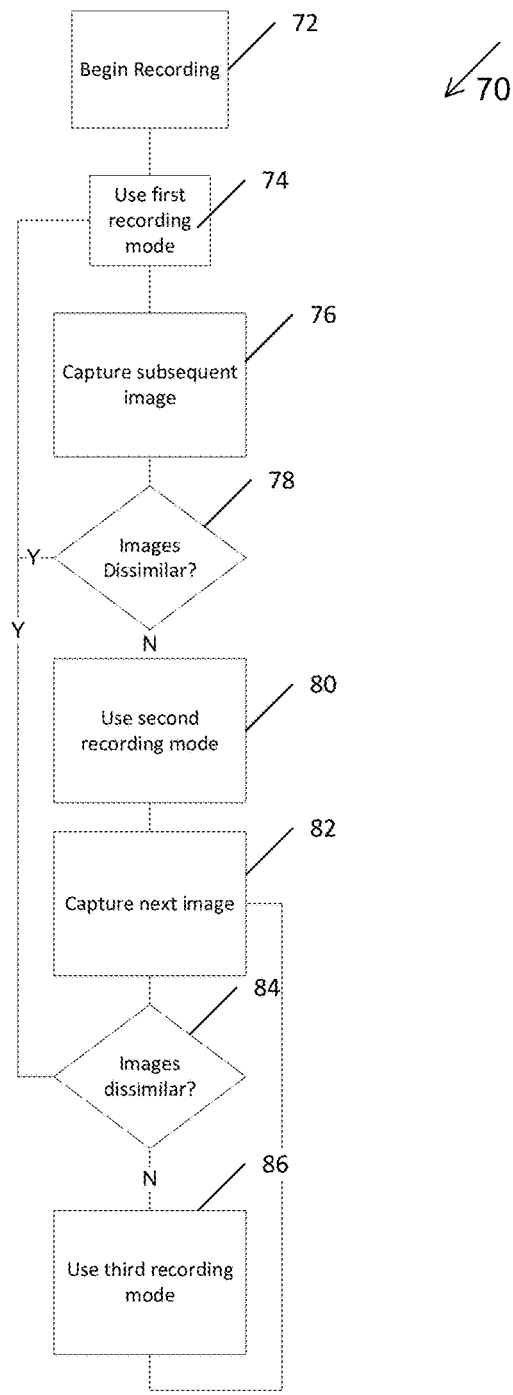
FIG. 3 illustrates a method of recording the images according to one example of the present invention.

FIG. 3 illustrates a method 70 of recording images according to one example of the present invention. After beginning the recording mode in step 72, due to determining that the initial and subsequent images are different in camera N as in method 40, a first recording mode is used as in step 74. Image processor 14 saves the images in memory 16 using the first recording mode.

Figure 5A:
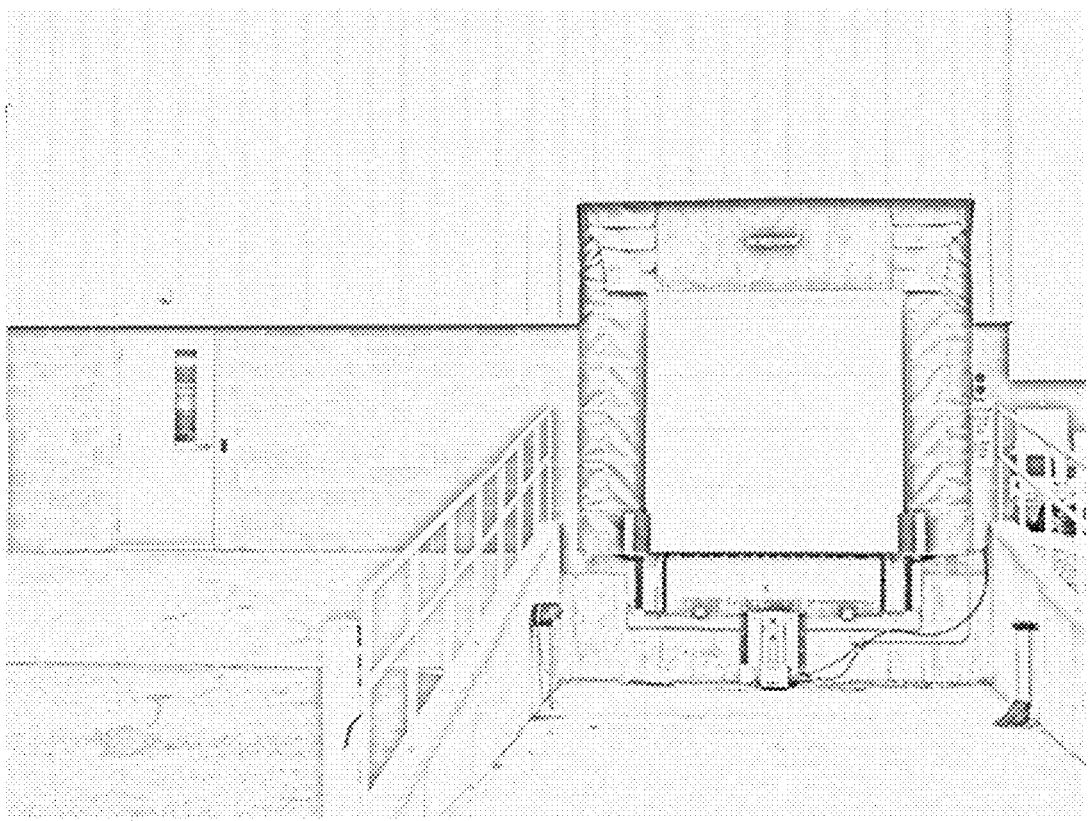
FIGS. 5A-5C illustrate images as recorded according to the method of FIG. 3.

The first recording mode, characterized as high quality mode, may include saving the images at a high resolution of 300 ppi. Alternatively, the first recording mode may include using a compression scheme having a 10:1 ratio. FIG. 5A shows an example of an image as stored in memory 16 using the first recording mode having the high resolution. The first recording mode may also include recording each image using a temporal resolution of once per second. The driver may be alerted via the output device 28 that the first recording mode is being used. The controller 12 may also communicate with the fleet location to indicate that the image processor 14 is recording at the first recording mode.

In step 76, the camera N captures a subsequent image. In step 78, image processor 14 analyzes the subsequent image to compare it with the initial image. The method 40 to identify differing images or an alternate algorithm may be used. If image processor 14 determines that the subsequent image is different than the initial image, the method 70 returns to step 74 to save the subsequent image at the first recording mode, or high resolution. If the image processor 14 determines that the subsequent image is not dissimilar from the initial image, the image processor 14 saves the subsequent image using a second recording mode in step 80.

Figure 5B:
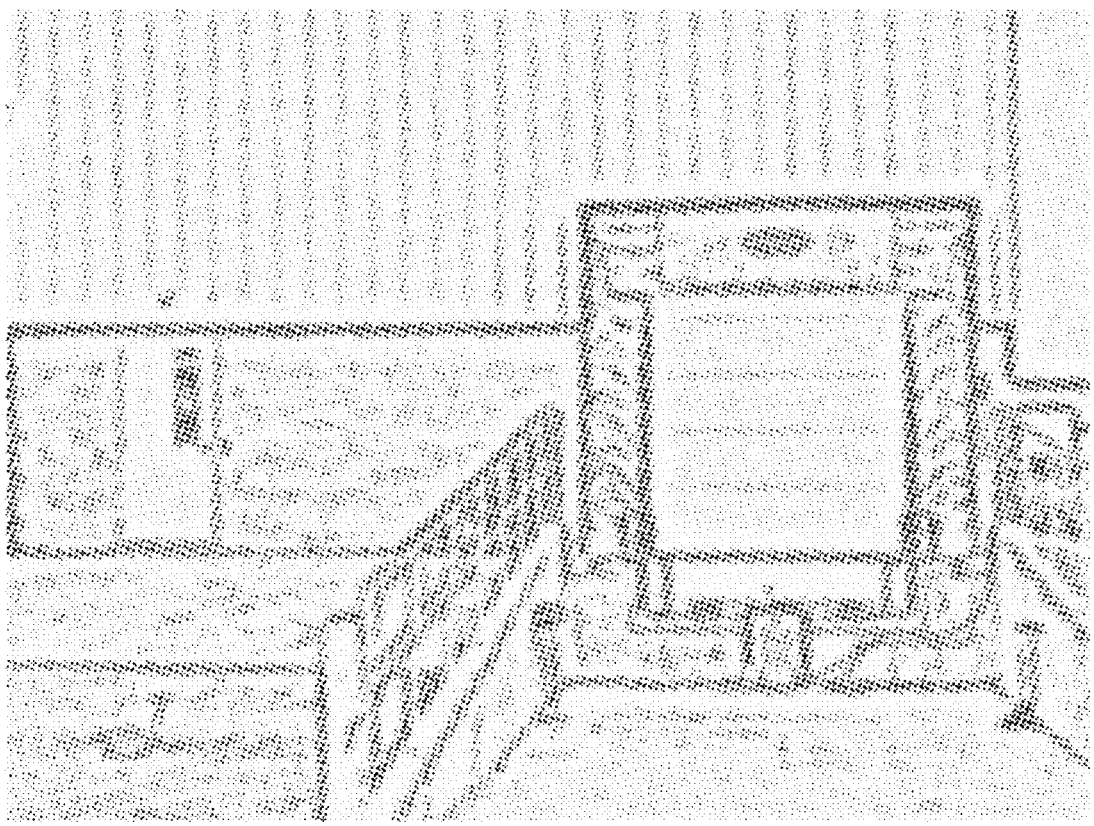

The second recording mode, characterized as medium quality or medium fidelity, is different than the first recording mode. In one example, the second recording mode saves the subsequent image at a resolution lower than the first resolution. FIG. 5B shows an example of the same image as in FIG. 5A but saved at a lower resolution, such as 150 ppi. Alternatively, the second recording mode may include using a compression having a 50:1 ratio. The second recording mode may include recording the subsequent images at using a different temporal resolution, such as recording each image at one per every two seconds.

In step 82, the camera N captures yet another image. In step 84, the image processor 14 analyzes the subsequent image to compare it with the immediately captured prior image. If the images are dissimilar, the method 70 returns to step 74 to save the image using the first recording mode. If there is no difference between the subsequent image and the immediate prior image, the method 70 continues to step 86. In step 86, the image processor 14 saves the subsequent image using a third recording mode.

Figure 5C:
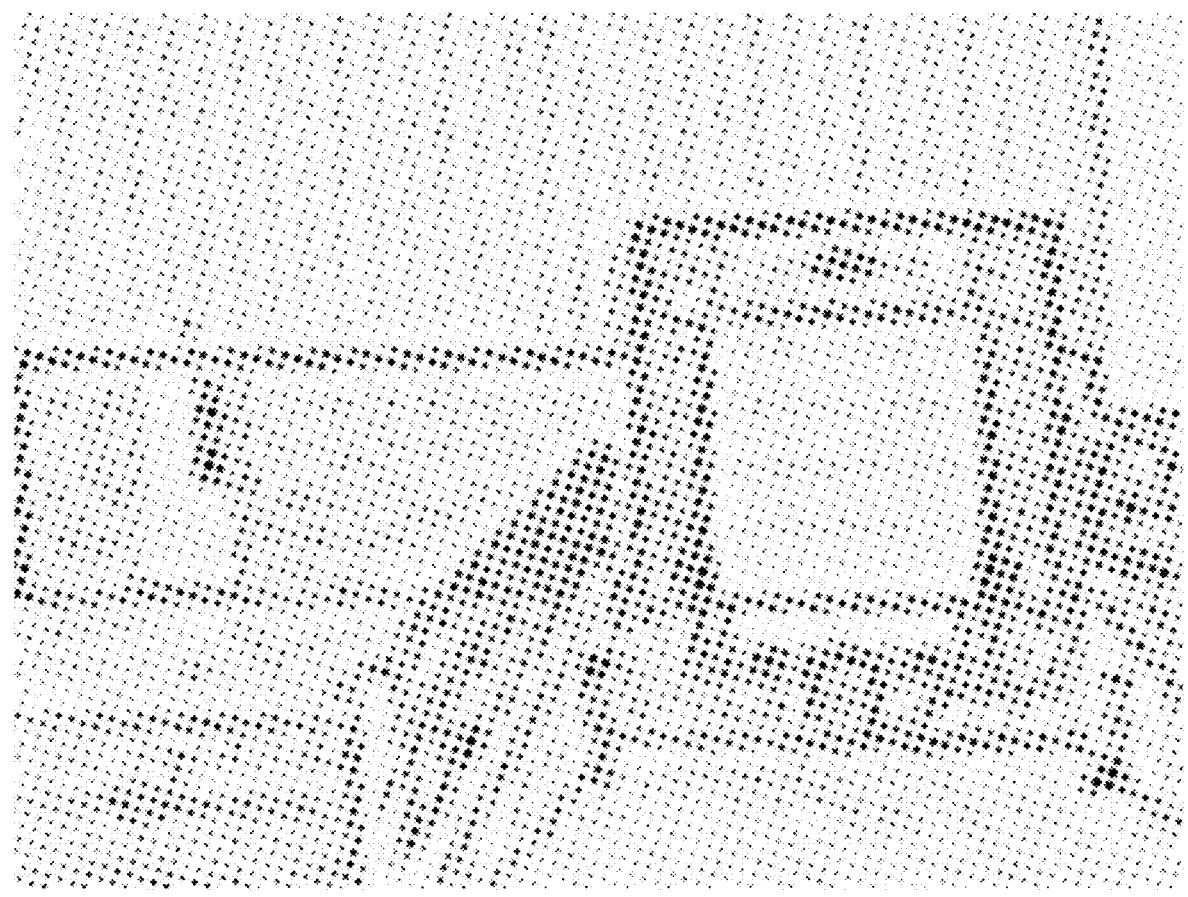

The third recording mode, which may be characterized as low quality or low fidelity, is different than the first and second recording modes. In one example, the third recording mode saves the subsequent image at a lower resolution, such as 72 ppi. Alternatively, the third recording mode may include using a compression scheme for storing the image of a 100:1 ratio. FIG. 5C shows an example of the same image as in FIG. 5A but saved using the third recording mode. The third recording mode may include recording the subsequent images using a different temporal resolution, such as recording each image at one per every four seconds.

Method 70 can continue for as long as the camera N is capturing images and the image processor 14 is processing the images. Alternatively, the vehicle operator or the fleet location can suspend the operation of method 70 through input device 30. In another embodiment, the recording of images will cease after a period of time in the third recording mode when it is determined that there is no change in the subsequent images.

In another example of this invention, the image may be saved with the special focus on and/or the highest resolution on only the section of the subsequent image that does differ from the initial image. This section may be identified by storing the row and column bounds of where significant pixel differences start and end.

Therefore, a method of modifying an imaging system that provides a view of an area surrounding and/or within an associated vehicle comprises receiving first image data, the first image data being related to a first image of a first target area and receiving second image data, the second image data being related to a second image of the first target area. The method determines if an image difference exists between the first image data and the second image data and records the first image data and the second image data at a first recording mode if an image difference exists and records the second image data at a second recording mode if an image difference does not exist.

Figure 4:
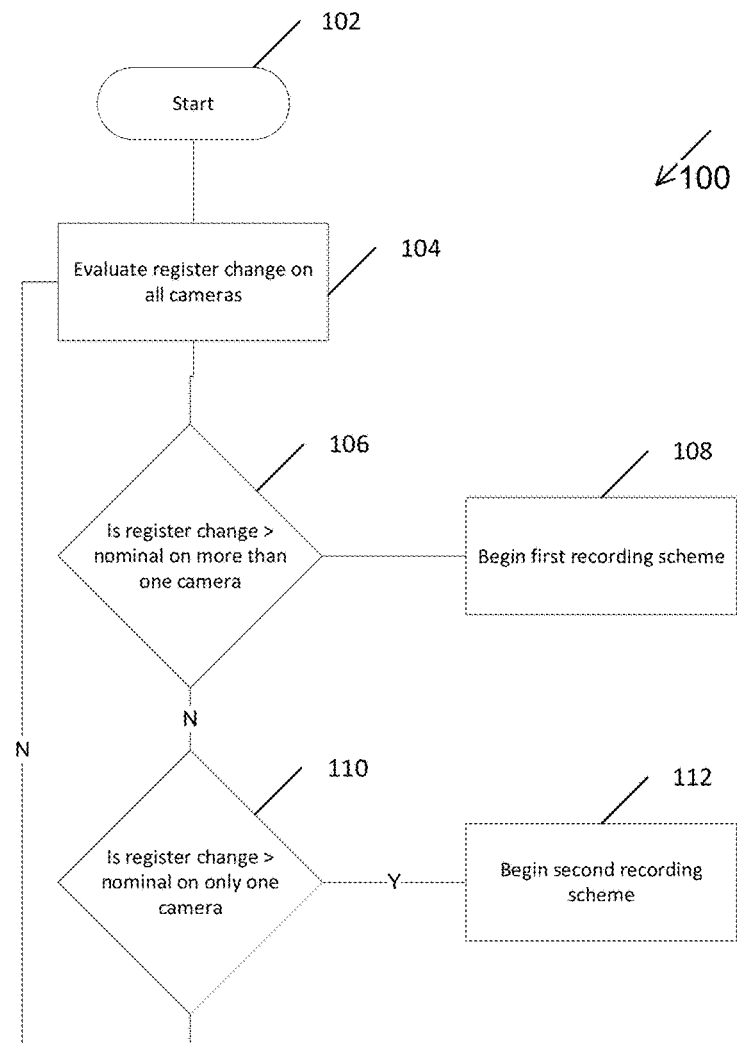
FIG. 4 illustrates a method of comparing and recording the images from multiple cameras according to another example of the present invention.

In FIG. 4, method 100 defines which camera of a plurality of camera images will be recorded and which recording mode will be used. In step 102, recording is initiated. In step 104, the register change is recorded between the initial image and subsequent image for all cameras. The register change is determined each image register on each camera by monitoring the exposure, gain, white balance and other scene derived quantities. The register values are calculated independent of the image processor 14. Large changes in a register generally indicate a change has occurred between the two images. This change could be due to movement in the image, such as when a camera image becomes darker when someone or something has entered the field of view of the camera. In method 100, the controller 12 is determining how and when to record when multiple cameras 18, 20, 22, 32 may be seeing image changes.

In step 106, the register change of all cameras 18, 20, 22, 32 is individually compared to a nominal value. If the register change of more than one camera is greater than the nominal value, the method 100 continues to step 108 to begin the first recording scheme.

First recording scheme may be similar to the method 70 as shown in FIG. 3 but implemented using each camera. First recording scheme may include recording a single image from all of the cameras having a register change in a round robin manner, such that one image from each camera is captured every other second. First recording scheme may include recording the images from all of the cameras such that each cameras' images are on a single color channel.

If the register change of only one camera is greater than the nominal value, the method 100 continues to step 110. The second recording scheme is begun in step 112 for the single camera having the register change greater than nominal.

The second recording scheme may be similar to the method 70, including reducing the resolution of the recorded images. The first and second recording schemes are designed to monitor the area internal and external to the vehicle and record images as necessary while limiting the amount of memory required.

If there is no register change on any camera, the method 100 returns to step 104 to evaluate register changes.

Therefore, a method for evaluating and recording images in a system having a plurality of cameras includes monitoring a register change of each image from the plurality of cameras, determining that at least one of the plurality of cameras has a register change greater than a nominal value; and recording the images in a first recording scheme from the at least one of the plurality of cameras having the register change.

Therefore, a method of reducing video storage space requirements includes determining a frame to frame video image difference exists and adjusting the recording mode of subsequent frames, wherein the recording modes differ in at least one of the number of frames recorded, the quality of the images, and the resolution of the image frames.

Furthermore, the system described herein may record at different rates, for example once per second or once per every 5 seconds; at different image compression settings; and at different image resolutions. Changing the rate, compression or resolution reduces recording space. The system can change one or more of these recording parameters if the brightness, contrast or pixel difference measures indicate it can do so. With multiple cameras, the cameras may be treated as a group, with the images from each recorded at the same rate, compression or resolution. The multiple cameras may also be treated individually, with the images from each recorded at possibly different rates, compression, or resolution. This latter method can save space compared with the groupwise method.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A camera system comprising: an image capture device; and a controller having a memory and an image processor, wherein the image processor receives a first image from the image capture device and a second image from the image capture device; monitors a register setting of the first image and the second image; determines that the register setting of the second image differs from the register setting of the first image; records the first and second image in the memory at a first recording mode based on the register setting of the second image differing from the register setting of the first image; monitors a register setting of a third image; determines that the register setting of the second image does not differ from the third image; and records the third image in the memory at a second recording mode based on the register setting of the third image not differing from the register setting of the second image.

2. The camera system as in claim 1, wherein the first recording mode has a higher resolution than the second recording mode.

3. The camera system as in claim 2, wherein the first recording mode is about twice the resolution of the second recording mode.

4. The camera system as in claim 1, wherein second recording mode comprises recording the second image and subsequent images at a frequency of about one frame per second.

5. The camera system as in claim 1, wherein in determining the register setting of the second image differs from the register setting of the first image, the image processor determines that the brightness median value has increased or decreased from the first image to the second image.

6. The camera system as in claim 1, wherein in determining the register setting of the second image differs from the register setting of the first image, the image processor determines that the contrast between the second image and the first image has increased or decreased.

7. A method of modifying an imaging system that provides a view of an area of an associated vehicle, the method comprising:
receiving first image data, the first image data being related to a first image of a first target area;
receiving second image data, the second image data being related to a second image of the first target area;
determining if a register setting difference exists between the first image data and the second image data; and
recording the first image data and the second image data at a first recording mode when a register setting difference exists and recording the second image data at a second recording mode when a register setting difference does not exist.

8. The method as in claim 7, wherein the first recording mode has a higher per image pixel count than the second recording mode.

9. The method as in claim 7, wherein the second recording mode remains active until a subsequent image has a register setting difference from a prior image data, the recording then returning to the first recording mode.

10. The method as in claim 7, wherein in determining the register setting of the second image changed from the register setting of the first image, the image processor determines that an associated sensor indicated a change in the environment of a vehicle.

11. The method as in claim 7, further comprising continuing to record at the first recording mode when the vehicle is stopped off of a usual route.

12. A method for evaluating and recording images in a system having a plurality of cameras, the method comprising:
monitoring a register change of each image from the plurality of cameras;
determining that at least one of the plurality of cameras has a register change greater than a nominal value; and
recording the images in a first recording scheme from the at least one of the plurality of cameras having the register change.

13. The method as in claim 12, further comprising determining only one of at least one of the plurality of cameras has a register change; and recording the image from the only one of the at least one of the plurality of cameras in a second recording scheme.

14. The method as in claim 12, wherein the first recording mode includes recording a single image from all of the at least one of the plurality of cameras having the register change in a round robin manner.

15. The method as in claim 12, wherein the first recording scheme includes recording the images from all of the at least one of the plurality of cameras such that each camera's images are on a single color channel.

16. The method as in claim 12, wherein the second recording scheme includes reducing the resolution of the recorded images.

17. The method as in claim 12, further comprising receiving data indicating that the vehicle is in an unauthorized location and continuing to record in the first recording scheme.

* * * * *